United States Patent
Jakov et al.

(10) Patent No.: US 10,783,066 B2
(45) Date of Patent: Sep. 22, 2020

(54) APPLICATION CONTENT DISPLAY AT TARGET SCREEN RESOLUTIONS

(71) Applicant: ENTIT SOFTWARE LLC, Sanford, NC (US)

(72) Inventors: Eyal Jakov, Yehud (IL); Moshe Eran Kraus, Yehud (IL); Shlomi Nissim, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 16/078,240

(22) PCT Filed: Feb. 24, 2016

(86) PCT No.: PCT/US2016/019339
§ 371 (c)(1),
(2) Date: Aug. 21, 2018

(87) PCT Pub. No.: WO2017/146696
PCT Pub. Date: Aug. 31, 2017

(65) Prior Publication Data
US 2019/0065354 A1    Feb. 28, 2019

(51) Int. Cl.
*G06F 9/44* (2018.01)
*G06F 11/36* (2006.01)
(Continued)

(52) U.S. Cl.
CPC ...... *G06F 11/3688* (2013.01); *G06F 11/3664* (2013.01); *G06F 11/3696* (2013.01);
(Continued)

(58) Field of Classification Search
CPC ............ G06F 11/3688; G06F 11/3692; G06F 11/3668; G06F 11/3664
(Continued)

(56) References Cited

U.S. PATENT DOCUMENTS 5,856,748 A * 1/1999 Seo .................. G11C 7/062
                                                    327/53
6,161,216 A * 12/2000 Shagam ............ G06F 11/3624
                                                    714/E11.209
(Continued)

FOREIGN PATENT DOCUMENTS

IN   2900CHE2013 A   7/2013
WO   WO2010126557    11/2010

OTHER PUBLICATIONS

Balcer et al, "Automatic Generation of Test Scripts from Formal Test Specifications", ACM, pp. 210-218 (Year: 1989).*
(Continued)

*Primary Examiner* — Anil Khatri

(57) ABSTRACT

A test system accesses a test script. The test script is to test an application at a target screen resolution. The test system tests the application using the test script, and a current screen resolution of the test system is different from the target screen resolution. In the test, the test system initializes a system web browser to run the application, and in the test, the test system overwrites a size parameter of the system web browser to cause a content window of the system web browser to display application content at the target screen resolution instead of the current screen resolution.

18 Claims, 7 Drawing Sheets

(51) Int. Cl.
  *G06F 16/957* (2019.01)
  *G06F 16/95* (2019.01)
  *G06F 3/14* (2006.01)
(52) U.S. Cl.
  CPC .......... *G06F 16/95* (2019.01); *G06F 16/9577* (2019.01); *G06F 3/14* (2013.01); *G09G 2340/0407* (2013.01)
(58) Field of Classification Search
  USPC .................................. 717/123–127, 140–142
  See application file for complete search history.

(56) References Cited

U.S. PATENT DOCUMENTS

| | | | | |
|---|---|---|---|---|
| 6,415,396 B1* | 7/2002 | Singh | ................. | G06F 11/3688 714/25 |
| 6,523,027 B1* | 2/2003 | Underwood | ............ | G06F 9/465 |
| 6,658,646 B1* | 12/2003 | Hernandez, III | ... | G06F 9/45512 717/114 |
| 6,701,514 B1* | 3/2004 | Haswell | .............. | G06F 11/3664 707/999.102 |
| 6,907,546 B1* | 6/2005 | Haswell | .............. | G06F 11/3684 714/38.11 |
| 7,313,564 B2* | 12/2007 | Melamed | ............ | G06F 11/3684 707/999.01 |
| 7,490,319 B2* | 2/2009 | Blackwell | ........... | G06F 11/3664 717/124 |
| 7,831,542 B2* | 11/2010 | Milov | ..................... | G06F 9/451 707/602 |
| 8,095,636 B2* | 1/2012 | Linville | .............. | G06F 11/3688 709/223 |
| 8,185,877 B1* | 5/2012 | Colcord | .................... | G06F 9/44 717/124 |
| 8,352,923 B2* | 1/2013 | Lopian | ................ | G06F 11/3688 703/22 |
| 8,392,890 B2* | 3/2013 | Miller | ................. | G06F 11/3696 717/127 |
| 8,490,056 B2* | 7/2013 | Lau | ........................ | G06F 11/368 706/45 |
| 8,566,648 B2* | 10/2013 | Schroeder | ........... | G06F 11/3672 714/38.14 |
| 8,856,748 B1* | 10/2014 | Larsen | ................ | G06F 11/3668 717/125 |
| 8,881,111 B1* | 11/2014 | Smith | ................. | G06F 11/3692 717/125 |
| 9,152,542 B2* | 10/2015 | Navalur | ............. | G06F 11/3684 |
| 2007/0079252 A1 | 4/2007 | Ramnani | | |
| 2010/0082733 A1 | 4/2010 | Bernstein et al. | | |
| 2012/0017172 A1 | 1/2012 | Sheth et al. | | |
| 2013/0227078 A1 | 8/2013 | Wei et al. | | |
| 2014/0253559 A1 | 9/2014 | Li et al. | | |

OTHER PUBLICATIONS

Offutt et al, "Generating test data from state-based specifications" Software Testing, Verification and Reliability, pp. 25-53 (Year: 2003).*
Kristensen et al, T"ype Test Scripts for TypeScript Testing", ACM, pp. 1-25 (Year: 2017).*
Grechanik, et al, "Maintaining and Evolving GUI-Directed Test Scripts", IEEE, pp. 408-418 (Year: 2009).*
Silveira et al, "Generation of Scripts for Performance Testing Based on UML Models", ACM, pp. 1-6 (Year: 2011).*
Katayama et al, "Event Interactions Graph for Test-case Generation of Concurrent Programs", IEEE, pp. 29-37 (Year: 1995).*
Daniel et al, Automated GUI Refactoring and Test Script Repair (Position Paper), ACM, pp. 38-41 (Year: 2011).*
International Search Report & Written Opinion received in PCT Application No. PCT/US2018/019339, dated Nov. 18, 2016, 10 pages.

* cited by examiner

APPLICATION CONTENT DISPLAY AT TARGET SCREEN RESOLUTIONS

BACKGROUND

With rapid advances in technology, electronic devices have become increasingly prevalent in society today. Laptop computers, desktop computers, mobile phones, and tablet devices are but a few examples of electronic devices that may allow a user to access digital data, communicate across interconnected networks (such as the Internet), execute web-based applications, and the like.

BRIEF DESCRIPTION OF THE DRAWINGS

Certain examples are described in the following detailed description and in reference to the drawings.

DETAILED DESCRIPTION

Examples consistent with the present disclosure may support application testing through a test script configured to test an application at a target screen resolution. An application may be designed to run on various device types, such as computers, cell phones, tablet devices, and other electronic devices with different screen resolution capabilities. As such, test scripts to test the application may be designed to test the application at a particular screen resolution that may be specific to a particular set or type of electronic device. This screen resolution that the test script is designed or configured for may be referred to as a target screen resolution. Various screen resolution adjustment features described herein may be implemented by a test system to cause rendering of application content at the target screen resolution of the test script. Such features may be useful in testing systems with screen resolutions that differ from the target screen resolution of a particular test script. Thus, the features described herein may support testing of the application at the target screen resolution that the test script was designed for.

The features described herein may support screen resolution adjustments for select portions of a system display, for example through causing a content window of a web browser to display application content at the target screen resolution while leaving other portions of the display unaffected (e.g., continuing to display screen content at the current screen resolution, and not the target screen resolution). As such, the screen resolution adjustment features may provide flexible, accurate, and efficient application testing for systems constrained to a particular screen resolution that differs from the target screen resolution that a test script is designed for.

Figure 1:
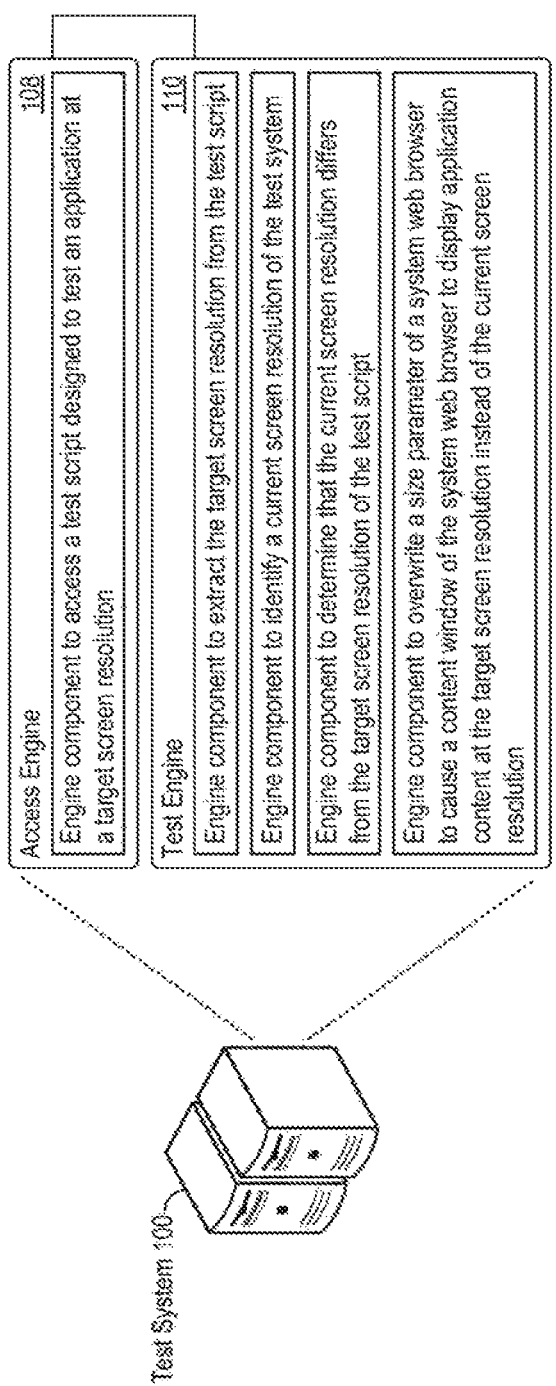
FIG. 1 shows an example of a test system supports application content display at target screen resolutions.

FIG. 1 shows an example of a test system 100 that supports application content display at target screen resolutions. The test system 100 may take the form of a computing system, including a single or multiple computing devices such as application servers, compute nodes, desktop or laptop computers, smart phones or other mobile devices, tablet devices, embedded controllers, and more.

The test system 100 may support application testing. In that regard, the test system 100 may access and execute a test script that tests a particular application, which may also be referred to as an application under test. A test script may take the form of instructions performed upon the application under test to ensure the application satisfies any number of functionality requirements. In some examples, a test script tests graphical elements of an application, such as by testing that interface elements are present and properly rendered within a user interface, that a particular application workflow results in the display of correct application screens, that application images, buttons, widgets, graphs, or other textual or graphical application elements are properly located and scaled, and the like. Thus, a test script may test any application element that utilizes a graphical mechanism to confirm the proper functionality of the application.

A test script may be designed for a target screen resolution. The screen resolution of a system executing the test script or running the application under test may affect the location at which particular user interface elements are rendered on a display. Thus, the target screen resolution at which a test script is designed for may specify the screen resolution at which an application under test should be rendered at in order for the test script to accurately test the application. The accuracy and effectiveness of a test script may be impacted when the application is rendered at a screen resolution different from the target screen resolution, for example through graphical elements being rendered in different locations or not even rendered at all. In such a case, the results of the test script may fail due to the screen resolution of the test system as opposed to errors or bugs attributable to the application itself, which may impair the effectiveness of an application testing process.

As described in greater detail below, the test system 100 may adapt the screen resolution at which application content of an application under test is rendered to match the target screen resolution of a test script used to test the application. In the example shown in FIG. 1, the test system 100 implements an access engine 108 and a test engine 110 to provide screen resolution adjustment features to render application content at a target screen resolution.

The test system 100 may implement the engines 108 and 110 (and components thereof) in various ways, for example as hardware and programming. The programming for the engines 108 and 110 may take the form of processor-executable instructions stored on a non-transitory machine-readable storage medium, and the processor-executable instructions may, upon execution, cause hardware to perform any of the features described herein. In that regard, various programming instructions or modules of the engines 108 and 110 may implement engine components to support or provide the screen resolution adjustment features described herein. The hardware for the engines 108 and 110 may include a processing resource to execute those instructions. A processing resource may include various number of processors and may be implemented through a single-processor or multi-processor architecture. In some examples, the test system 100 implements multiple engines using the same system features or hardware components (e.g., a common processing resource).

The access engine 108 and test engine 110 may include components to support adjustment of screen resolutions for application testing to match the target screen resolution of a test script. In the example implementation shown in FIG. 1, the access engine 108 includes an engine component to access a test script configured to test an application at a target screen resolution, for example through retrieval from a database or through a communication from a remote device. As also shown in the example implementation of FIG. 1, the test engine 110 includes engine components to extract the target screen resolution from the test script; identify a current screen resolution of a system display of the test system; determine that the current screen resolution differs from the target screen resolution of the test script; and, in response to such a determination, overwrite a size parameter of a system web browser to cause a content window of the system web browser to display application content at the target screen resolution instead of the current screen resolution. These features and more discussed in greater detail below as well.

Some example features relating to screen resolution adjustments to display application content at a target screen resolution are described in greater detail next. Many of the following examples are described within the context of web application testing and application content displayed through a web browser. However, any of the screen resolution adjustment features described herein may be consistently applied to various other forms of application testing as well.

Figure 2:
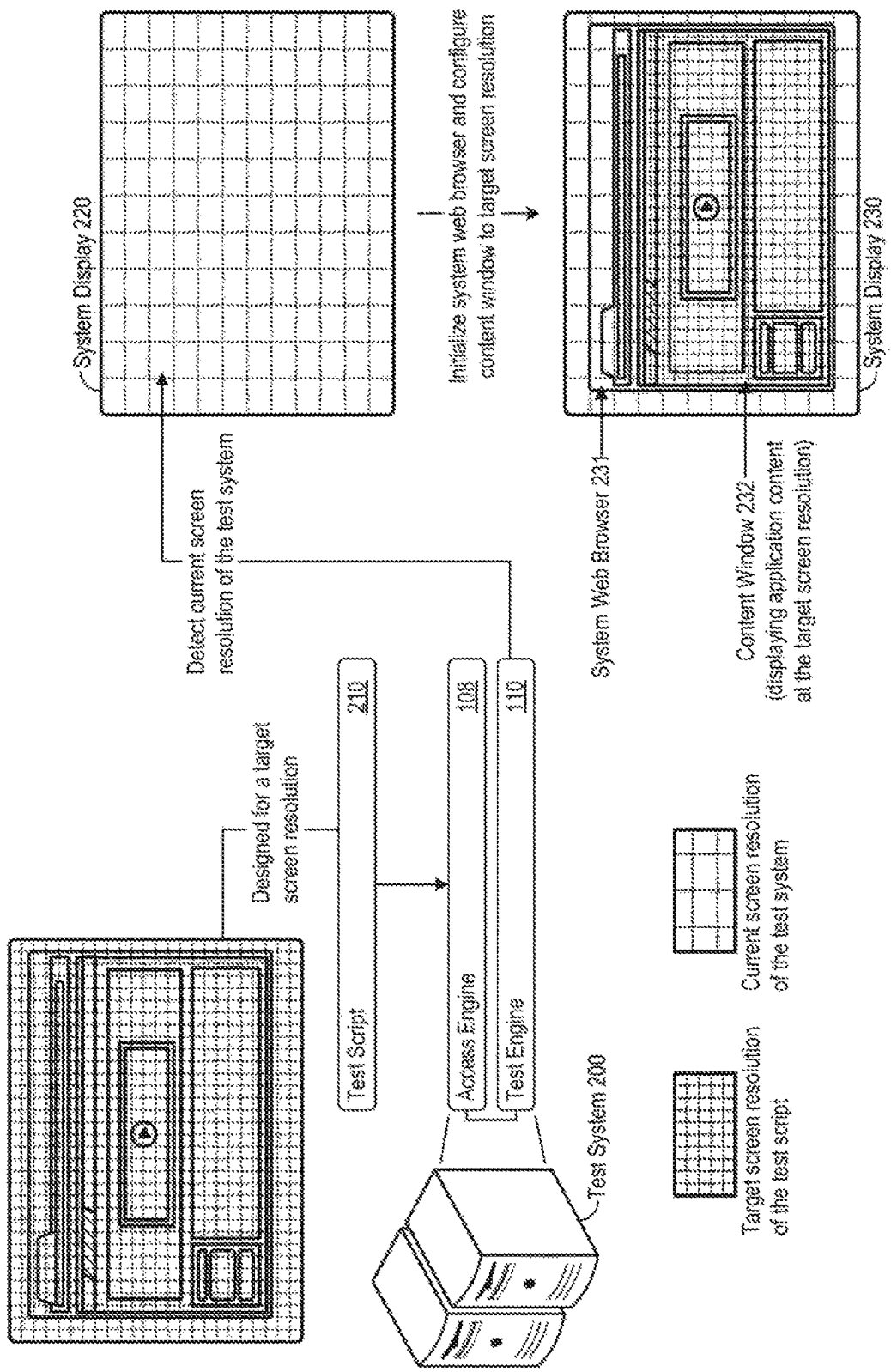
FIG. 2 shows an example of a test system that may perform a screen resolution adjustment to display application content at target screen resolutions.

FIG. 2 shows an example of a test system 200 that may perform a screen resolution adjustment to display application content at target screen resolutions. In particular, FIG. 2 illustrates a test system 200 that includes (e.g., implements) an access engine 108 and a test engine 110.

In operation, the access engine 108, the test engine 110, or both, may execute programming stored on a machine-readable medium through a processing resource. Doing so may cause the engines 108 and 110 to perform any of the features described herein. For example, the access engine 108 may access a test script 210 designed for a target screen resolution. In accessing the test script 210, the access engine 108 may retrieve the test script 210 from a local memory or receive the test script 210 from a test generation device, which may be remote to the test system 200. The test script 210 may be generated (e.g., recorded) through the test generation device, and the test script 210 may be particularly designed for a target screen resolution. For instance, the target screen resolution may be the screen resolution at which an application under test was rendered during a recording of the test script on the test generation device.

In operation, the test engine 110 may cause application content tested by the test script 210 to be rendered at the target screen resolution of the test script 210. In the context of web application testing, the test engine 110 may cause a web browser to render the application at the target screen resolution instead of a current screen resolution of the test system 200 that executes the test script 210. In doing so, the test engine 110 may determine that the current screen resolution of the test system 200 differs from the target screen resolution of the test script 210. The test engine 110 may obtain the current screen resolution of the test system 200 as well as the target screen resolution of the test script 210 in various ways. For example, the test engine 110 may detect the current screen resolution of the test system 200 (e.g., of a system display of the test system 200) by accessing a system parameter, such as an operating system (OS) screen resolution parameter specifying the current screen resolution. For the target screen resolution of the test script 210, the test engine 110 may extract the target screen resolution from the test script 210 itself, e.g., as an embedded operational parameter of the test script 210, or by receiving a separate indication from a test generation device (or other testing device) specifying the target screen resolution for the test script 210.

In the example shown in FIG. 2, the target screen resolution of the test script 210 and current screen resolution of the test system 200 are displayed through different dotted grids on example system displays. The system display 220 of the test system 200 shown in FIG. 2 shows an empty display screen of the test system 200 rendered at the current screen resolution of the test system 200, which differs from the target screen resolution that the teat script 210 is designed for.

Upon identifying that the current screen resolution differs from the target screen resolution of the test script 210, the test engine 110 may initialize a system web browser to run the application under test and configure a content window of the system web browser to display application content at the target screen resolution. A content window may refer to any visual portion that displays application content. Thus, the content window of a web browser may refer to the portion of the web browser that displays web resources, e.g., rendered HTML web pages, images, videos, or other content. When running a web application, the content window of the system web browser 231 may display the application content. Accordingly, the test engine 110 may adjust the display resolution of the content window such that application content is rendered at the target screen resolution of the test script 210.

To illustrate through FIG. 2, the system display 230 of the test system 200 displays a system web browser 231 including a content window 232 rendering application content at the target screen resolution instead of the current screen resolution of the test system 200. The test engine 110 may use various screen resolution adjustment techniques to cause the content window 232 to render application content at the target screen resolution of the test script 210 instead of the current screen resolution of the test system 200. In some examples, the adjustment technique may include the test engine 110 overwriting a size parameter of the content window. The size parameter may specify a window size (e.g., in pixels), a display resolution, or any other size metric at which content window renders content. The system web browser 231 set the size parameter for the content window during a browser initialization, in response to a browser resizing operation, upon detecting an indication to open a new browser window or tab, or in various other scenarios. For some or all of these scenarios, the test engine 110 may overwrite the size parameter corresponding to content rendering at the current screen resolution of the test system 200 to a particular size (or resolution value) that causes the content window (and, as such, the application content) to be rendered at the target screen resolution instead.

In some examples, the test engine 110 adjusts the screen resolution at which application content is displayed without adjusting the overall screen resolution of the test system 200. That is, the test engine 110 may cause the rendering of application content at the target screen resolution while leaving other portions of a system display unchanged. In FIG. 2, the portions of the system display 230 outside of the system web browser 231 remain rendered at the current screen resolution of the test system 200, as do portions of the system web browser 231 outside of the content window 232. Such portions of the system web browser 231 may include browser borders, address bars, favorite bars, or various other portions of the system web browser 231 outside of the content window 232.

Put another way, the test engine 110 may adjust the resolution at which application content is displayed in the system web browser 233 without altering the current screen resolution of test system 200, e.g., without changing OS screen resolution parameter or other system variable that controls the screen resolution of the test system 200. In doing so, the test engine 110 may support test script execution in test systems with predetermined, constrained, or non-configurable screen resolutions. For example, the test system 200 may limit execution of the test script 210 under certain system conditions, such as particular OS login credentials or session parameters. Such constraints may be maintained by the system for security purposes, for example. These system conditions and constraints may limit the test system 200 (and any test script executions) to a particular screen resolution, such as a 1024×768 screen resolution limited for level-0 sessions of an operating system. Thus, even under level-0 sessions or other constrained sessions or systems, the test engine 110 may adjust the screen resolution of the content window 232 to ensure proper testing of an application using the test script 210.

Figure 3:
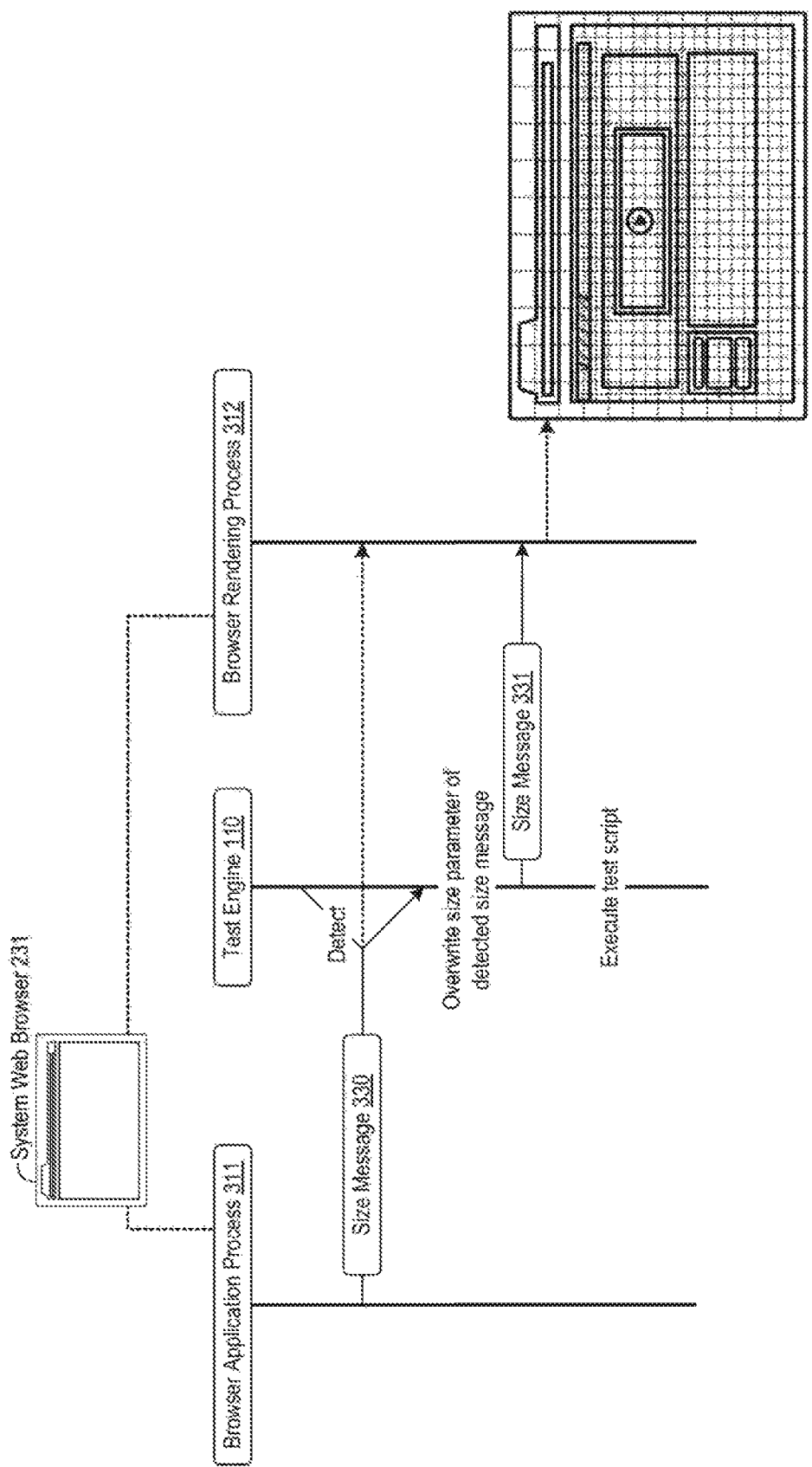
FIG. 3 shows an example of screen resolution adjustment that a test engine may perform through a parameter overwrite.

FIG. 3 shows an example of screen resolution adjustment that the test engine 110 may perform through a parameter overwrite. In particular, FIG. 3 shows an example in which the test engine 110 may intercept messages exchanged between processes of a web browser to overwrite a content window size parameter. In FIG. 3, a system web browser 231 includes multiple processes shown as a browser application process 311 and a browser rendering process 312. The browser application process 311 may be a process that parses web resources to identify web resources and the browser rendering process 312 may be a separate process that renders the identified web resources.

The test engine 110 may hook unto the browser application process 311 and listen for size messages passed to the browser rendering process 312, such as the size message 330 shown in FIG. 3. Hooking between processes may refer to any detection or listening techniques to identify a function call, message, or event exchanged between the processes, such as the size message 330. The size message 330 detected by the test engine 110 may be any inter-process communication that specifies a size parameter at which to render a content window of the system web browser 231. The size parameter may, for example, specify a window height and a window length for the content window of the system web browser 231.

To describe hooking in another way, the test engine 110 may hook unto the data channel by which the browser application process 311 and the browser rendering process 312 exchange inter-process communications. That is, the test engine 110 may identify a particular data channel for the inter-process communications between the browser application process 311 and the browser rendering process 312 and listen on the particular data channel for the size message 330 including the size parameter of the content window.

To identify the particular data channel by which the browser application process 311 and browser rendering process 312 exchange communications, the test engine 110 may hook unto particular OS functions called to create and pass data through the particular data channel. The test engine 110 may hook to a data channel creation function of an OS of the test system, for example hooking onto a CreateNamedPipe function that creates a data pipe or data channel between system processes. The CreateNamedPipe function may take processes as inputs (e.g., through process IDs) and generate, as an output, a pipe identifier (e.g., handle) referenced to exchange communications between the processes. Accordingly, the test engine 110 may identify a call to a data channel creation function that specifies the browser application process 311 and the browser rendering process 312 as input parameters and determine, as an output of the data channel creation function, a channel identifier that identifies the particular data channel.

Through identification of the particular data channel, the test engine 110 may listen for inter-process communications from the browser application process 311 to the browser rendering process 312. The test engine 110 may do so through hooking onto a data channel write function of an OS of the test system. The data channel write function may communicate data across a data channel specified by an input channel identifier. Accordingly, the test engine 110 may detect an inter-process communication between the browser application process 311 and the browser rendering process 312 by identifying a call to a data channel write function that specifies a channel identifier of the particular data channel as an input parameter to the data channel write function.

One example of a data channel write function is a WriteFile function that takes, as an input, a handle for a previously created data pipe. Thus, calls to the WriteFile function specifying the channel identifier between the browser application process 311 and the browser rendering process 312 may indicate an inter-process communication is being exchanged between the processes 311 and 312. The test engine 110 may listen on the particular data channel by identifying a call to the data channel write function that specifies a channel identifier of the particular data channel as an input parameter to the data channel write function. The call to the data channel write function may also include or reference the size message 330 as well.

Upon identifying the size message 330, the test engine 110 may overwrite a size parameter specified within the size message 330 that is specific to the content window of the system web browser 231. The overwritten size parameter may specify a resolution or content window size corresponding to the target screen resolution of a test script instead of the current screen resolution of a test system rendering the system web browser 231. The test engine 110 may determine the overwritten size parameter in various ways. When the size parameter specifies a display resolution for the content window, the test engine 110 may overwrite the size parameter of the size message (which may be set to the current screen resolution of the test system) to the target screen resolution instead. When the size parameter specifies a height and width for the content window, the test engine 110 may adjust the height and width values of size parameter by a height and width ratio between the target screen resolution and current screen resolution respectively. In that way, the test engine 110 may cause the system web browser 231 to render application content within a content window at the target screen resolution of a test script instead of the current screen resolution at which the test system renders a display.

After overwriting the size parameter of the size message 330, the test engine 110 may send an updated size message with the overwritten size parameter to the browser rendering process 312, shown in FIG. 3 as the size message 331. In some examples, the test engine 110 overwrites the size parameter and sends the updated size message through intercepting a call to a data channel write function by the browser application process 311 and instead calling the data channel write function with the overwritten size parameter (corresponding to the target screen resolution) instead of the original size parameter specified by the browser application process 311 (corresponding to the current screen resolution of the test system). Thus, the system web browser 231 may render the content window at the target screen resolution, whereupon the test engine 110 may execute a test script designed for the target screen resolution.

Figure 4:
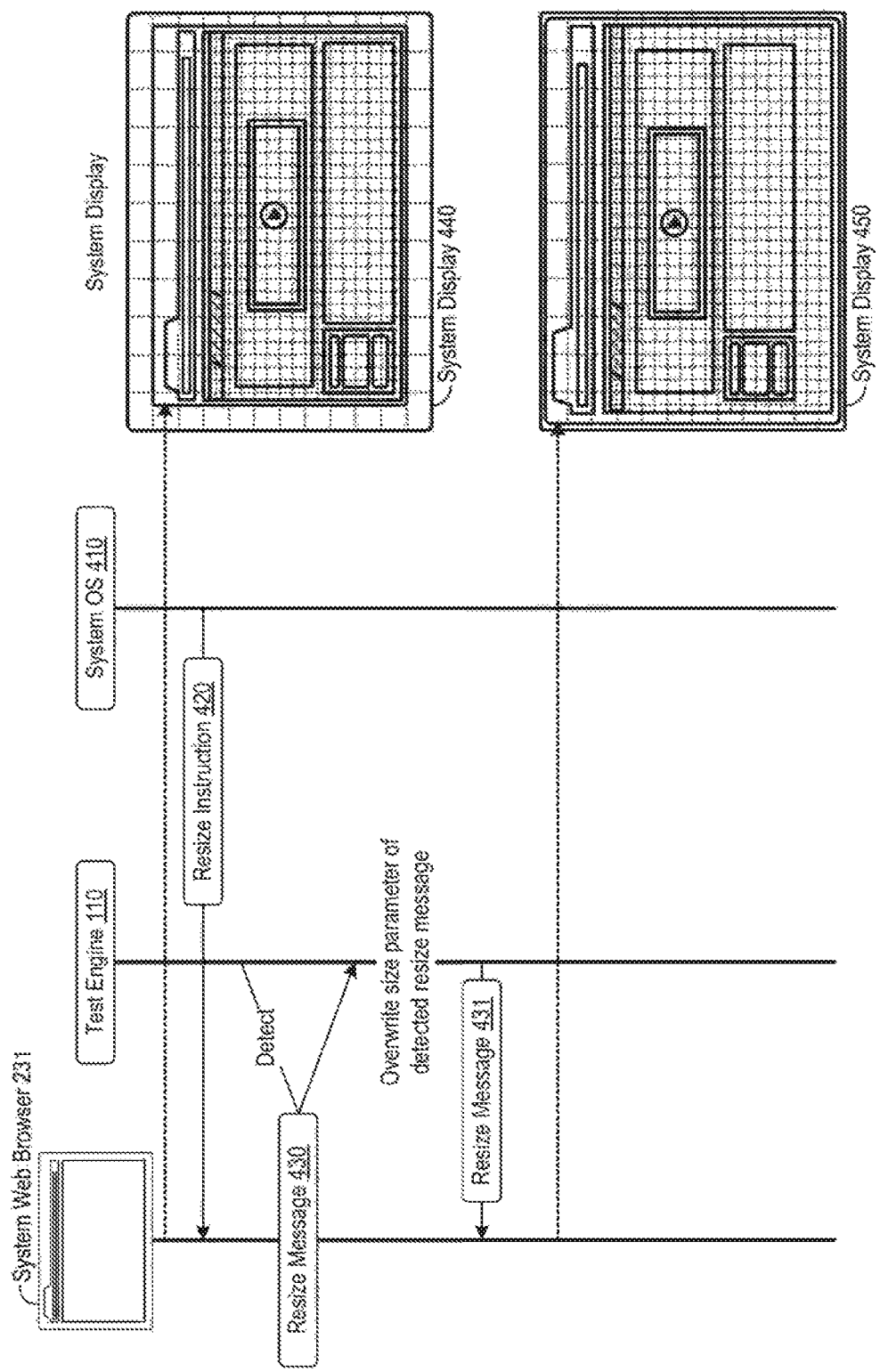
FIG. 4 shows an example of a screen resolution adjustment that a test engine may perform in response to a resize instruction.

FIG. 4 shows an example of a screen resolution adjustment that the test engine 110 may perform in response to a resize instruction. A resize instruction may refer to any communication received by a system web browser that causes a system web browser to change in display size. Examples of system actions, events, or commands that may trigger a resize instruction to a system web browser include maximize browser commands and browser border adjustments, whether initiated by a user, other applications, a test script, or any other logical system entity. The resize instruction may be communicated to a system web browser before or during execution of a test script designed for a target screen resolution. The test engine 110 may ensure that application content tested by a test script is rendered at a target screen resolution even after the system web browser is resized.

In the example shown in FIG. 4, a system OS 410 sends a resize instruction 420 to a system web browser 231. The system OS 410 may detect a user input (e.g., a mouse click or touch gesture) to resize the system web browser 231, and send the resize instruction 420 in response. In other examples, the test engine 110 may send the resize instruction 420 to the system web browser 231, e.g., to trigger a browser resizing process through which the test engine 110 may overwrite a size parameter to render application content a target screen solution. The test engine 110 may also trigger the resize instruction 420 to cause the system web browser 231 to be rendered at a predetermined display size according to a test script parameter (e.g., when the test script is configured to test a web application rendered at maximized screen size or any other predetermined pixel height and width).

In response to the resize instruction 420, the system web browser 231 may generate a resize message 430 to adjust the display size of the system web browser 231. The resize message 430 may be any communication or parameter through which the system web browser 231 adjusts the size of various elements of the system web browser 231 in accordance with the resize instruction 420. For example, the resize message 430 may specify an updated size parameter for a content window of the system web browser 231 to reflect the change in display size caused by the browser resizing.

The test engine 110 may detect the resize message 430 and overwrite the size parameter for the resized content window, whether through any of the process-level hooking examples described above or by overwriting an internal size parameter for the content window. The overwritten size parameter may specify a content window size or resolution that causes the system web browser 231 to display application content at the target screen resolution of a test script instead of the current screen resolution of the test system. In doing so, the test engine 110 may update the resize message 430 and send an updated resize message with the overwritten size parameter to the system web browser 231, e.g., as an inter-process communication to an browser rendering process of the system web browser 231.

The test engine 110 may thus cause the system web browser 231 to continue to display application content at the target screen resolution even when a system web browser 231 (including the content window) is resized before or during execution of a test script. This concept is illustrated through example system displays shown in FIG. 4. The system display 440 depicts a system display of a test system prior to issuance of the resize instruction 420 by the system OS 410. In the system display 440, the system web browser 231 covers some, but not all, of the system display and a content window of the system web browser 231 renders application content at a target screen resolution of a test script. The system display 450 depicts the system display after the system web browser 231 is resized (e.g., maximized), in which the system web browser 231 is resized to cover a larger portion of the system display, but continues to display application content at the target screen resolution instead of a current screen resolution of the test system.

Figure 5:
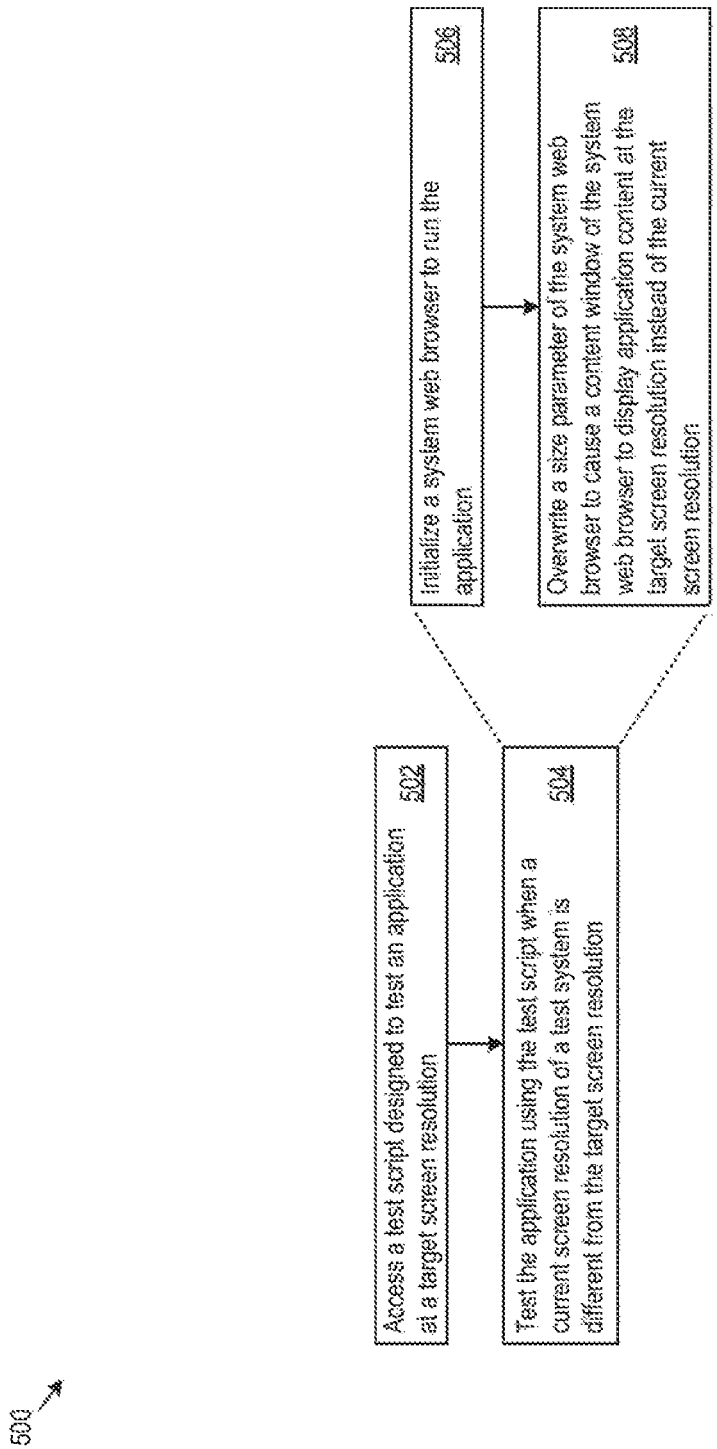
FIG. 5 shows an example of logic that a system or device may implement to support application content display at target screen resolutions.

FIG. 5 shows an example of logic 500 that a system or device may implement to support application content display at target screen resolutions. A test system may implement the logic 500 as hardware, executable instructions stored on a machine-readable medium, or as combinations of both. In some examples, a test system implements the logic 500 through the access engine 108 and the test engine 110, by which the test system may perform or execute the logic 500 as a method to display and test application content at the target screen resolution of a test script.

In implementing or performing the logic 500, an access engine 108 may access a test script configured to test an application at a target screen resolution (502). A test engine 110 may test the application using the accessed test script, and do so when a current screen resolution of the test system is different from the target screen resolution of the test script (504). In testing the application using the test script, the test engine 110 may initialize a system web browser to run the application being tested (506) and overwrite a size parameter of the system web browser to cause a content window of the system web browser to display application content at the target screen resolution instead of the current screen resolution (508). After overwriting the size parameter, the test engine 110 may execute the test script, as the system web browser may render application content at the target screen resolution that the test script is designed for.

Figure 6:
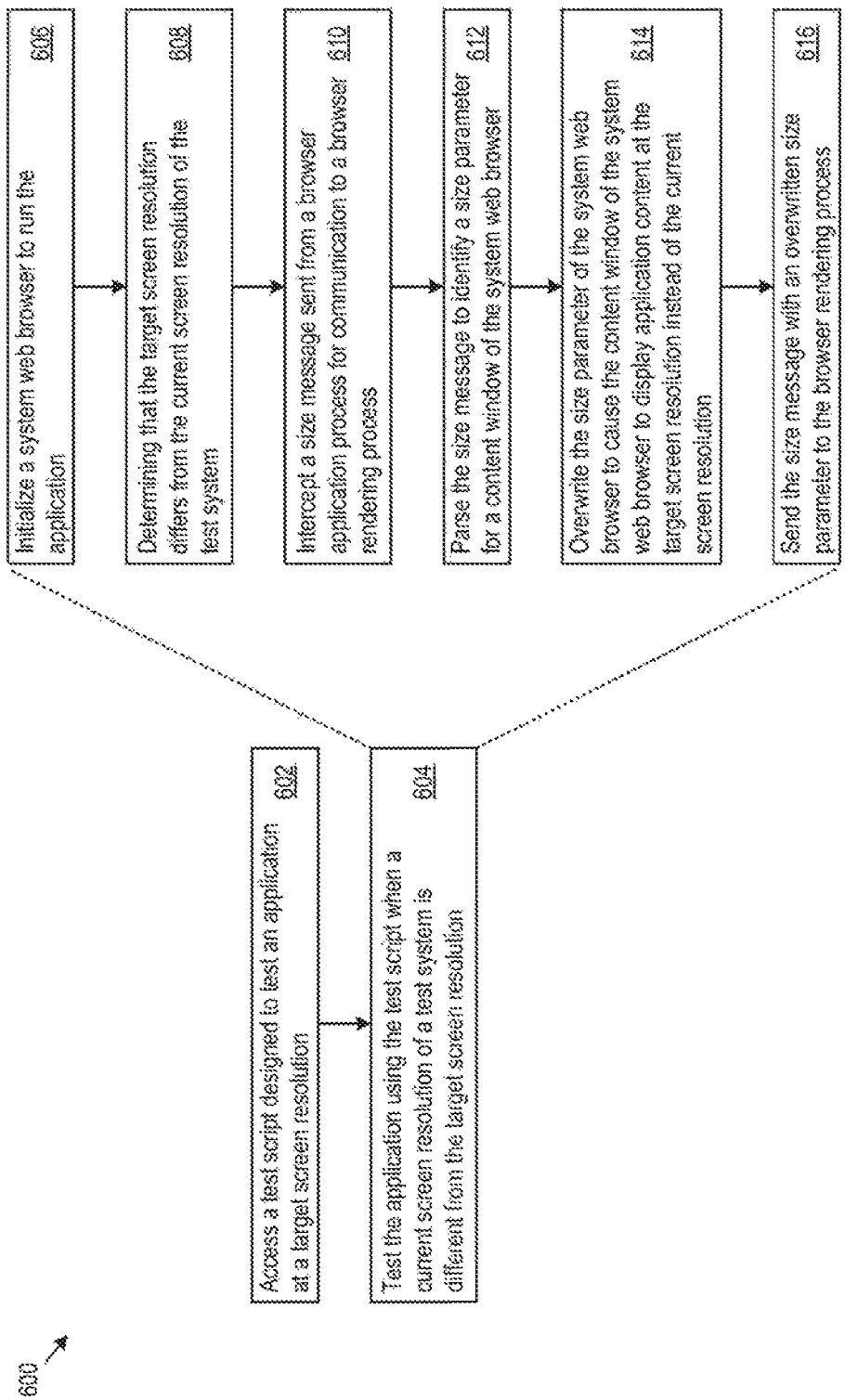
FIG. 6 shows another example of logic that a system or device may implement to support application content display at target screen resolutions.

The logic 500 may include any number of additional or alternative elements as well, including any other features described herein with respect to the access engine 108, the test engine 110, or both FIG. 6 shows an example of logic 600 that a system or device may implement to support application content display at target screen resolutions. Along similar lines as the logic 500, a test system may implement the logic 600 as hardware, executable instructions stored on a machine-readable medium, or as combinations of both, including through the access engine 108 and the test engine 110. In implementing the logic 600 through the access engine 108 and the test engine 110, the test system may perform or execute the logic 600 as a method to display and test application content at the target screen resolution of a test script.

Through the logic 600, an access engine 108 may access a test script configured to test an application at a target screen resolution (602). A test engine 110 may test the application using the accessed test script, and do so when a current screen resolution of the test system (e.g., of a system display of the test system) is different from the target screen resolution of the test script (604). In testing the application using the test script, the test engine 110 may initialize a system web browser to run the application being tested (606). The test engine 110 may determine that the target screen resolution differs from the current screen resolution of the test system (608), e.g., differing from the current screen resolution of a single or multiple system displays. In determining that the target screen resolution differs from the current screen resolution, the test engine 110 may identify the target screen resolution from a test script parameter specified by the test script, identify the current screen resolution of the test system from a system parameter of the test system, and compare the target screen resolution to the current screen resolution.

Execution of the system web browser may include a browser application process and a browser rendering process, and the test engine 110 may intercept a size message sent from the browser application process for communication to the browser rendering process (608). Then, the test engine 110 may parse the size message to identify a size parameter for a content window of the system web browser (610).

After parsing and identification of the size parameter within the intercepted size message, the test engine 110 may overwrite the size parameter of the system web browser to cause the content window of the system web browser to display application content at the target screen resolution instead of the current screen resolution (612). In doing so, the test engine 110 may modify the size parameter from an initial value (e.g., window dimensions) specific to the current screen resolution of the test system to an overwritten or modified value specific to the target screen resolution instead. After overwriting the size parameter, test engine 110 may send the size message with an overwritten size parameter to the browser rendering process (614).

The logic 600 may include any number of additional or alternative elements as well, including any other features described herein with respect to the access engine 108, the test engine 110, or both.

Figure 7:
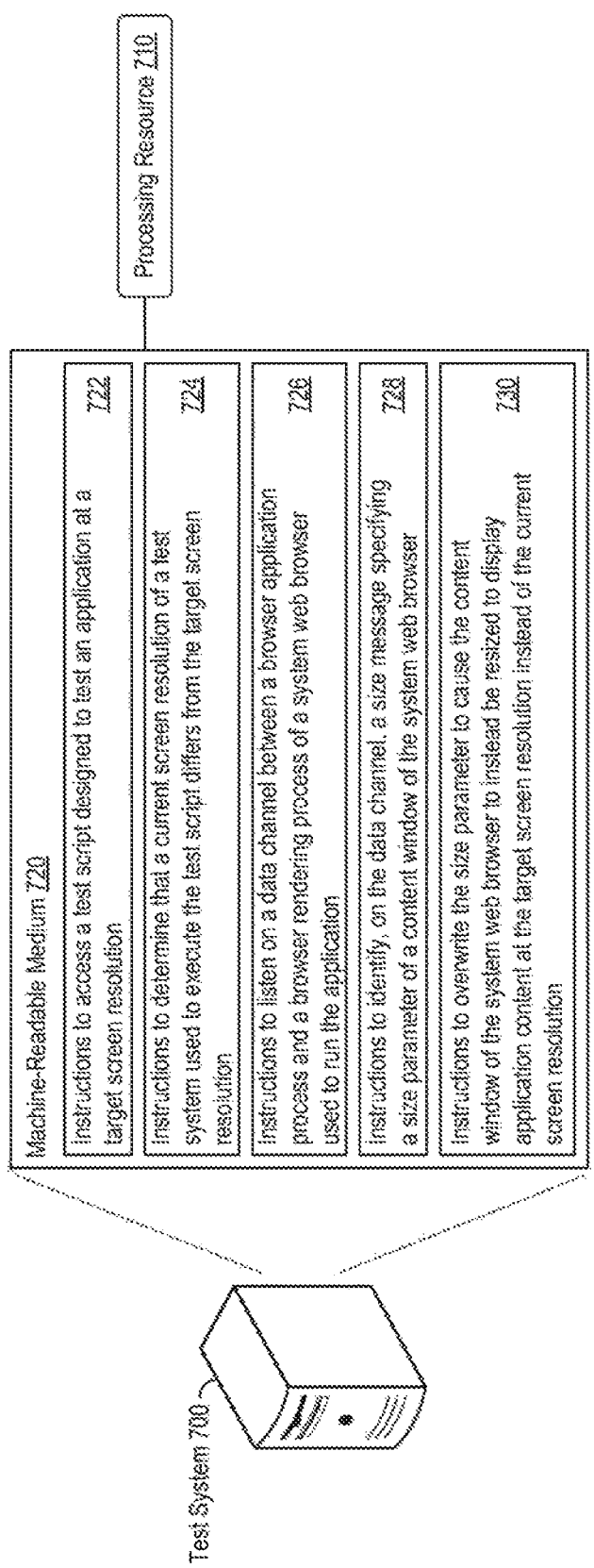
FIG. 7 shows an example of a test system that supports application content display at target screen resolutions.

FIG. 7 shows an example of a test system 700 that supports application content display at target screen resolutions. The test system 700 may include a processing resource 710, which may take the form of a single or multiple processors. The processor(s) may include a central processing unit (CPU), microprocessor, or any hardware device suitable for executing instructions stored on a machine-readable medium, such as the machine-readable medium 720 shown in FIG. 7. The machine-readable medium 720 may be any non-transitory electronic, magnetic, optical, or other physical storage device that stores executable instructions, such as the instructions 722, 724, 726, 728, and 730 in FIG. 7. As such, the machine-readable medium 720 may be, for example, Random Access Memory (RAM) such as dynamic RAM (DRAM), flash memory, memristor memory, spin-transfer torque memory, an Electrically-Erasable Programmable Read-Only Memory (EEPROM), a storage drive, an optical disk, and the like.

The test system 700 may execute instructions stored on the machine-readable medium 720 through the processing resource 710. Executing the instructions may cause the test system 700 to perform any of the screen resolution adjustment features described herein, including according to any features of the access engine 108, the test engine 110, or both.

For example, execution of the instructions 722, 724, 726, 728, and 730 by the processing resource 710 may cause the test system 700 to access a test script configured to test an application at a target screen resolution; determine that a current screen resolution of a system display of the test system used to execute the test script differs from the target screen resolution, and in response to such a determination, listen on a data channel between a browser application process and a browser rendering process of a system web browser used to run the application; identify, on the data channel, a size message specifying a size parameter of a content window of the system web browser; and overwrite the size parameter to cause the content window of the system web browser to display application content at the target screen resolution instead of the current screen resolution.

In some examples, the machine-readable medium 720 may include instructions executable by the processing resource 710 to, after the size parameter is overwritten, execute the test script when the system web browser is displaying the application content at the target screen resolution. As another example, the machine-readable medium 720 may include instructions executable by the processing resource 710 further to identify the data channel by hooking to a data channel creation function of an operating system of the test system. The output of the data channel creation function may take the form of a channel identifier, by which execution of the instructions may cause the processing resource 710 to identify the data channel through the channel identifier. In this example, the instructions may be executable by the processing resource 710 to identify the size message on the data channel by hooking unto a data channel write function that includes the channel identifier specific to the data channel as an input parameter.

As described above, a test system may support application testing using a test script designed for a target screen resolution when the current screen resolution of the test system differs from the target screen resolution. The test system may do so through any of the screen resolution adjustment features described herein, including overwriting the size parameter of a content window such that a system web browser renders application content in a content window at the target screen resolution instead of the current screen resolution. The test system may thus provide increased flexibility and accuracy in application testing, by overcoming screen resolution limitations of test systems or OS sessions with preset or non-configurable screen resolutions. As such, the test system may flexibly support application testing at a target screen resolution independent of the current screen resolution at which the test system renders a system display.

The systems, methods, devices, and logic described above, including the access engine 108 and the test engine 110, may be implemented in many different ways in many different combinations of hardware, logic, circuitry, and executable instructions stored on a machine-readable medium. For example, the access engine 108, the test engine 110, or both, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the access engine 108, the test engine 110, or both.

The processing capability of the systems, devices, and engines described herein, including the access engine 108 and the test engine 110, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
through a test system:
accessing a test script, wherein the test script is to test an application at a target screen resolution; and
testing the application using the test script when a current screen resolution of the test system is different from the target screen resolution, wherein the testing comprises:
initializing a system web browser to run the application;
intercepting a process message communicated through the test system, wherein the process message contains a size parameter of the system web browser; and
overwriting the size parameter to cause a content window of the system web browser to display application content at the target screen resolution instead of the current screen resolution.

2. The method of claim 1, further comprising, prior to overwriting the size parameter:
determining that the target screen resolution differs from the current screen resolution of the test system.

3. The method of claim 2, wherein determining that the target screen resolution differs from the current screen resolution of the test system comprises:
identifying the current screen resolution of a system display of the test system from a system parameter of the test system; and
comparing the target screen resolution to the current screen resolution.

4. The method of claim 1, wherein execution of the system web browser includes a browser application process and a browser rendering process; and
wherein the intercepting comprises intercepting a communication from the browser application process to the browser rendering process, and the testing further comprises:
parsing the process message to identify the size parameter.

5. The method of claim 1, wherein the intercepting comprises:
hooking to a data channel write function to identify the process message.

6. The method of claim 4,
wherein the testing further comprises, after overwriting the size parameter, sending the process message with an overwritten size parameter to the browser rendering process.

7. The method of claim 1, further comprising identifying the target screen resolution from a test script parameter of the test script.

8. A system comprising:
an access engine to access a test script, wherein the test script is to test an application at a target screen resolution; and
a test engine to:
extract the target screen resolution from the test script;
identify a current screen resolution of a system display of the system;
determine that the current screen resolution differs from the target screen resolution of the test script; and in response to such a determination:
intercept a process message communicated through the system, wherein the process message comprises a size parameter of a system web browser; and
overwrite the size parameter to cause a content window of the system web browser to display application content at the target screen resolution instead of the current screen resolution.

9. The system of claim 8, wherein the test engine is to overwrite the size parameter after the system web browser receives a resize instruction from an operating system of the system.

10. The system of claim 8, wherein execution of the system web browser includes a browser application process and a browser rendering process; and
wherein the test engine is further to:
identify a particular data channel for inter-process communications between the browser application process and the browser rendering process; and
listen on the particular data channel for the process message.

11. The system of claim 10, wherein the test engine is to identify the particular data channel by:
hooking to a data channel creation function of an operating system of the system;
identifying a call to the data channel creation function that specifies the browser application process and the browser rendering process as input parameters to the data channel creation function; and
determining, as an output of the data channel creation function, a channel identifier that identifies the particular data channel.

12. The system of claim 10, wherein the test engine is to listen on the particular data channel by:
hooking to a data channel write function of an operating system of the system; and
identifying a call to the data channel write function that specifies a channel identifier of the particular data channel as an input parameter to the data channel write function.

13. The system of claim 8, wherein the test engine identifies the target screen resolution from a parameter of the test script.

14. A non-transitory machine-readable medium comprising instructions executable by a processing resource to:
access a test script, wherein the test script is to test an application at a target screen resolution;
determine that a current screen resolution of a system display of a test system used to execute the test script differs from the target screen resolution, and in response to such a determination:
listen on a data channel between a browser application process and a browser rendering process of a system web browser used to run the application;
intercept, on the data channel, a process message specifying a size parameter of a content window of the system web browser; and overwrite the size parameter to cause the content window of the system web browser to display an application content at the target screen resolution instead of the current screen resolution.

15. The non-transitory machine-readable medium of claim 14, wherein the instructions are further executable by the processing resource to send a process message with an overwritten size parameter to the browser rendering process.

16. The non-transitory machine-readable medium of claim 14, wherein the instructions are further executable by the processing resource to, after the size parameter is overwritten:
   execute the test script when the system web browser is displaying the application content at the target screen resolution.

17. The non-transitory machine-readable medium of claim 14, wherein the instructions are further executable by the processing resource to identify the data channel by hooking to a data channel creation function of an operating system of the test system.

18. The non-transitory machine-readable medium of claim 14, wherein the instructions are further executable by the processing resource to identify the target screen resolution from a parameter of the test script.

\* \* \* \* \*